(12) United States Patent
Lee et al.

(10) Patent No.: US 6,942,478 B2
(45) Date of Patent: Sep. 13, 2005

(54) PACKAGING MOLD WITH ELECTROSTATIC DISCHARGE PROTECTION

(75) Inventors: Meng-Tsang Lee, Kaoshiung (TW); Kuang-Lin Lo, Kaoshiung (TW)

(73) Assignee: Advanced Semiconductor Engineering, Inc., Kaoshiung (TW)

( * ) Notice: Subject to any disclaimer, the term of this patent is extended or adjusted under 35 U.S.C. 154(b) by 45 days.

(21) Appl. No.: 10/268,161

(22) Filed: Oct. 10, 2002

(65) Prior Publication Data

US 2003/0072832 A1 Apr. 17, 2003

(30) Foreign Application Priority Data

Oct. 12, 2001 (TW) ........................................ 90125234 A

(51) Int. Cl.[7] ............................................. B29C 45/14
(52) U.S. Cl. .................... 425/117; 425/127; 425/129.1; 425/544
(58) Field of Search ................. 425/117, 127, 425/129.1, 544

(56) References Cited

U.S. PATENT DOCUMENTS

| | | | | |
|---|---|---|---|---|
| 4,395,451 A | * | 7/1983 | Althouse | .................... 428/141 |
| 5,663,104 A | * | 9/1997 | Fukuyama | .................. 438/123 |

FOREIGN PATENT DOCUMENTS

| | | | | | | |
|---|---|---|---|---|---|---|
| JP | 62140426 A | * | 6/1987 | | .......... | H01L/21/56 |
| JP | 05309686 A | * | 11/1993 | | .......... | B29C/45/02 |
| JP | 06015683 A | * | 1/1994 | | .......... | B29C/45/02 |
| JP | 06143360 A | * | 5/1994 | | .......... | B29C/45/37 |
| JP | 06151647 A | * | 5/1994 | | .......... | H01L/23/28 |
| JP | 06155511 A | * | 6/1994 | | .......... | B29C/45/02 |
| JP | 07232352 A | * | 9/1995 | | .......... | B29C/45/26 |
| JP | 2000133666 A | * | 5/2000 | | .......... | H01L/21/56 |

* cited by examiner

*Primary Examiner*—Robert B. Davis
(74) *Attorney, Agent, or Firm*—Seyfarth Shaw LLP

(57) ABSTRACT

The present invention relates to a packaging mold with electrostatic discharge protection comprising a pot block and at least one receiver. The pot block comprises a plurality of pots and runners. Each of the pots branches and connects the runners for injecting molding compound into the runners through the pots. The receiver for supporting a plurality of substrate plates connects the runners for receiving the molding compound from the runners to package the dice on the substrate plates. Each receiver comprises a receiving surface contacting the substrate plate; wherein the receiving surface is roughened to reduce static electric charges generated when separating the substrate plates and the packaging mold. Additionally, the surfaces of the runners are roughened to reduce static electric charges generated in the runners when separating the molding compound and the runners. It prevents the dice packaged from damage due to static electric charges to raise the yield rate of semiconductor package products thereby.

3 Claims, 4 Drawing Sheets

PACKAGING MOLD WITH ELECTROSTATIC DISCHARGE PROTECTION

BACKGROUND OF THE INVENTION

1. Field of the Invention

The present invention relates to a packaging mold, particularly to a packaging mold with electrostatic discharge protection.

2. Description of the Related Art

FIG. 1 shows a conventional packaging lower mold 1, wherein the lower mold 1 combines an upper mold (not shown) to package dice. The conventional packaging lower mold 1 comprises a pot block 11 and two receivers 12, 13. The pot block 11 comprises five pots 111, 112, each pot connecting a plunger (not shown) for injecting molding compound into the pot and branching and connecting two runners 116, 117 for injecting the molding compound into the runners 116, 117, respectively.

Each of the two receivers 12, 13 for supporting five substrate plates having dice connects the runners 116, 117 for receiving the molding compound from the runners in order to package the dice and the substrate plates supported by the receivers 12, 13. The conventional receivers 12, 13 have receiving surfaces 121, 131 respectively connecting the substrate plate, wherein the receiving surfaces 121, 131 are smooth.

Static electric charges are often generated when objects of different materials connect and then separate. Therefore, electrostatic voltage, usually 1 KV/in, is generated between the receiver surfaces 121, 131 and the substrate plate when separating from the packaging lower mold 1 after encapsulation. The larger area of connecting is, the more static electric charges are generated when separating.

Similarly, electrostatic voltage, usually about 2 KV/in, is generated when separating the molding compound and the runners 116, 117.

Therefore, it is necessary to provide an innovative and advanced packaging mold so as to solve the above problem.

SUMMARY OF THE INVENTION

One objective of the present invention is to provide a packaging mold with electrostatic discharge protection comprising a pot block and at least one receiver. The pot block comprises a plurality of pots and runners. Each of the pots branches and connects the runners for injecting molding compound into the runners through the pots. The receiver for supporting a plurality of substrate plates connects the runners for receiving the molding compound from the runners to package dice on the substrate plates. Each receiver comprises a receiving surface contacting the substrate plate; wherein the receiving surface is roughened to reduce static electric charges generated when separating the substrate plates and the packaging mold, thus preventing the dice packaged from damage due to static electric charges.

Another object of the invention is to provide a packaging mold with electrostatic discharge protection where the surfaces of the runners are roughened to reduce static electric charges generated in the runners when separating the molding compound and the runners.

DETAILED DESCRIPTION OF THE INVENTION

Figure 2:
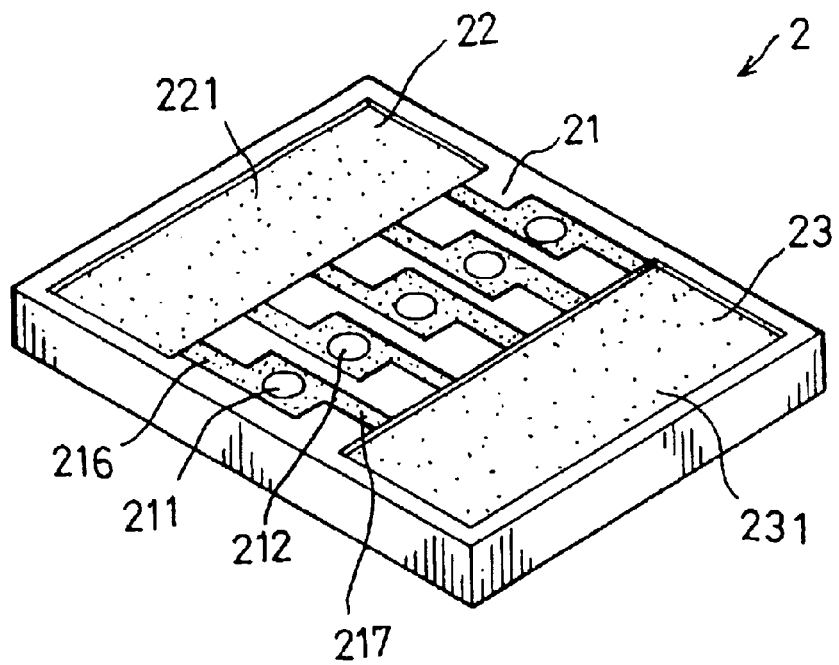
FIG. 2 shows the packaging mold according to the invention.

Referring to FIG. 2, a packaging mold 2 according to the invention comprises a pot block 21 and two receivers 22, 23. The pot block 21 comprises five pots 211, 212, each pot connecting a plunger (not shown) for injecting molding compound into the pot and branching and connecting two runners 216, 217 for injecting the molding compound into the runners 216, 217, respectively.

Each of the two receivers 22, 23 for supporting five substrate plates having dice (not shown) connects the runners 216, 217 for receiving the molding compound from the runners in order to package the dice and the substrate plates supported by the receivers 22, 23. The receivers 22, 23 receiving surfaces 221, 231 respectively contacting the substrate plate.

Figure 1:
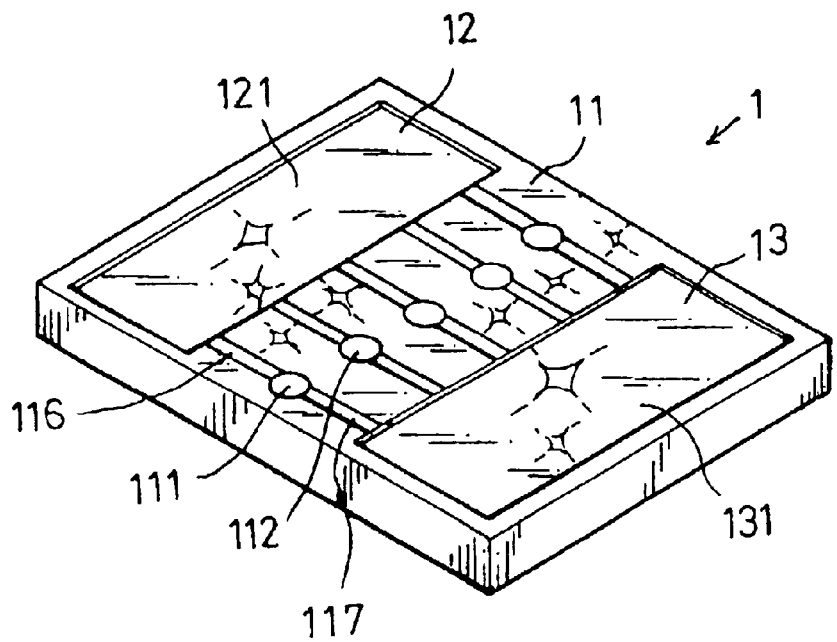
FIG. 1 shows the conventional packaging mold.

In order to reduce the area contacting the substrate plates, the receiving surfaces 221, 231 are roughened. When separating the substrate plate and the packaging mold 2 after encapsulating, static charges generated between the substrate plates and the receiving surfaces are enormously lowered as the area of the substrate plate contacting the receiver is reduced. The electrostatic voltage measured is lowered than 25 V/in. However, the electrostatic voltage is usually about 1 KV/in when separating the conventional packaging mold 1 (FIG. 1). The packaging mold 2 according to the invention dramatically reduces the electrostatic voltage generated between the substrate plate and the receiving surface.

Similarly, the surfaces of the runners 216, 217 are roughened in the packaging mold 2 to reduce the area of the molding compound connecting the runners 216, 217, so that the static electric charges generated in the runners 216, 217 can be reduced when separating the molding compound and the runners 216, 217. The electrostatic voltage measured can be lower than 400 V/in. Comparatively, the electrostatic voltage is usually about 2 KV/in when separating the conventional packaging mold 1 (FIG. 1). The packaging mold 2 according to the invention also dramatically reduces the electrostatic voltage generated between the molding compound and the runners 216, 217.

Figure 3:
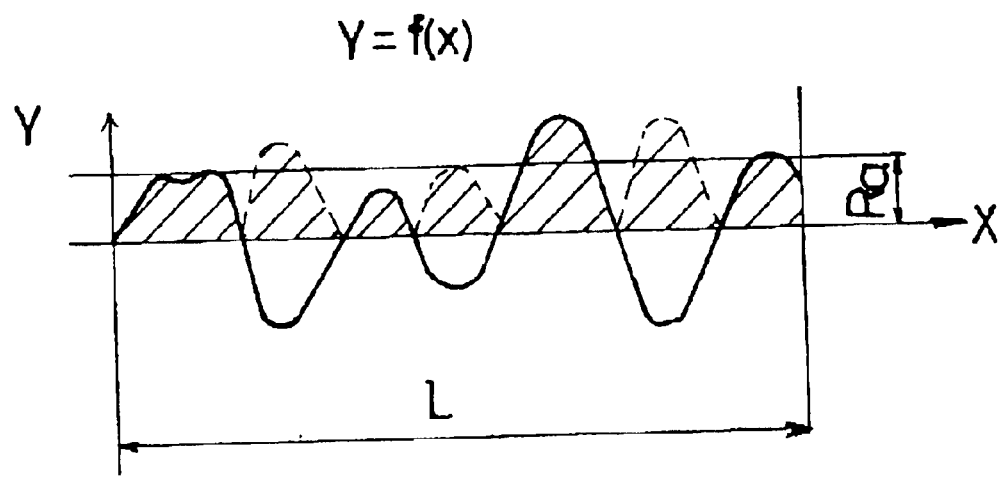
FIG. 3 shows the average roughness of centerline of a roughened surface.

In order to quantify the degree of roughness of the receiving surfaces and the runners, average roughness of centerline ($R_a$) is taken. Referring to FIG. 3, the definition of average roughness of centerline is described below. A length L is taken from a rough curve of a treated surface. A depth of centerline in the length is the X-axis, and a vertical line of centerline is the Y-axis, and the rough curve can be expressed in y=f(x). The parts of the curve under the X-axis is converted to the corresponding parts of the curve above the X-axis. The area above the X-axis and under the converted curve (regions of oblique lines) is calculated and then divided by the length. The value representing average roughness of centerline in the length of the treated surface is obtained according to a formula (1) listed below in the unit of μm:

$$R_a = \frac{1}{L}\int_0^l |f(x)|\,dx \quad (1)$$

Figure 4:
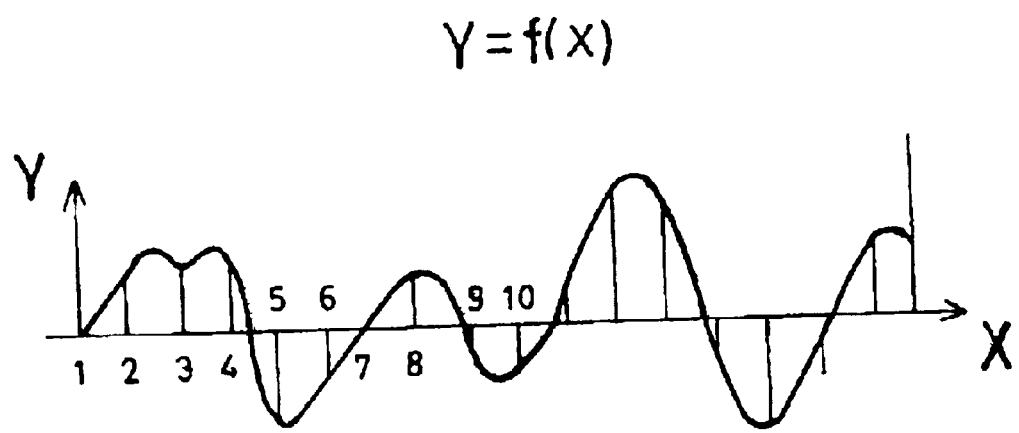
FIG. 4 shows the approximate value of average roughness of centerline of a roughened surface.

Referring to FIG. 4, after dividing the curve y=f(x) into equal parts along centerline, the y values are obtained in every part, and the approximate $R_a$ is obtained according to a formula (2):

$$R_a \cong \frac{y_1 + y_2 + y_3 + \ldots + y_n}{n} = \frac{\sum_{t=1}^{n} y_t}{n} \quad (2)$$

Figure 5:
FIG. 5 shows a cross-sectional view of the molding compound and a roughened surface with an over high value of average roughness of centerline.

According to the definition of average roughness of centerline, the receiving surface 121 of the receiver 12 in the conventional packaging mold 1 is smooth with average roughness of centerline between 0.010 to 0.20 μm. Preferably, the average roughness of centerline of a treated surface in the invention ranges from 0.25 to 1.6 μm. It is not really the case that the higher the average roughness of centerline of the roughened surface is, the more effect it has. Referring to FIG. 5, if average roughness of centerline is overly high, softened hot molding compound 51 will flow along a roughened surface 52 and hardened in the shape corresponding to that of the roughened surface. Therefore, the roughened surface with overly high average roughness of centerline will increase the area of the molding compound 52 contacting the roughened surface 52 on the contrary.

Figure 6:
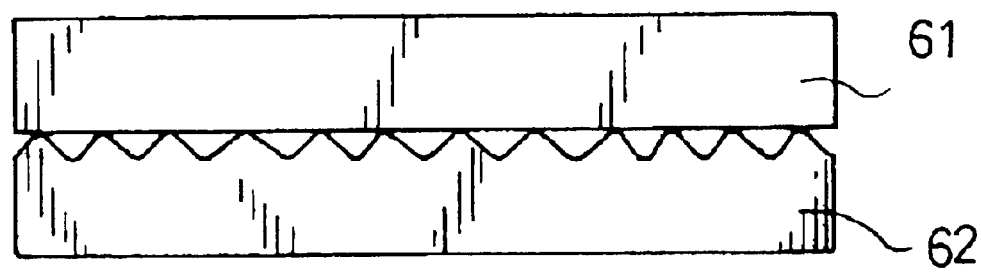
FIG. 6 shows a cross-sectional view of the molding compound and a roughened surface with a proper value of average roughness of centerline.

Referring to FIG. 6, if average roughness of centerline is proper, molding compound 61 will not flow along a roughened surface 62. The area of connection of the molding compound 61 and the roughened surface 62 is reduced from surface contact to point contact, so that static electric charges are eliminated when separating. Preferably, average roughness of centerline of a treated surface in the invention ranges from 0.25 to 1.6 μm, and can be made by sandblast.

Figure 7:
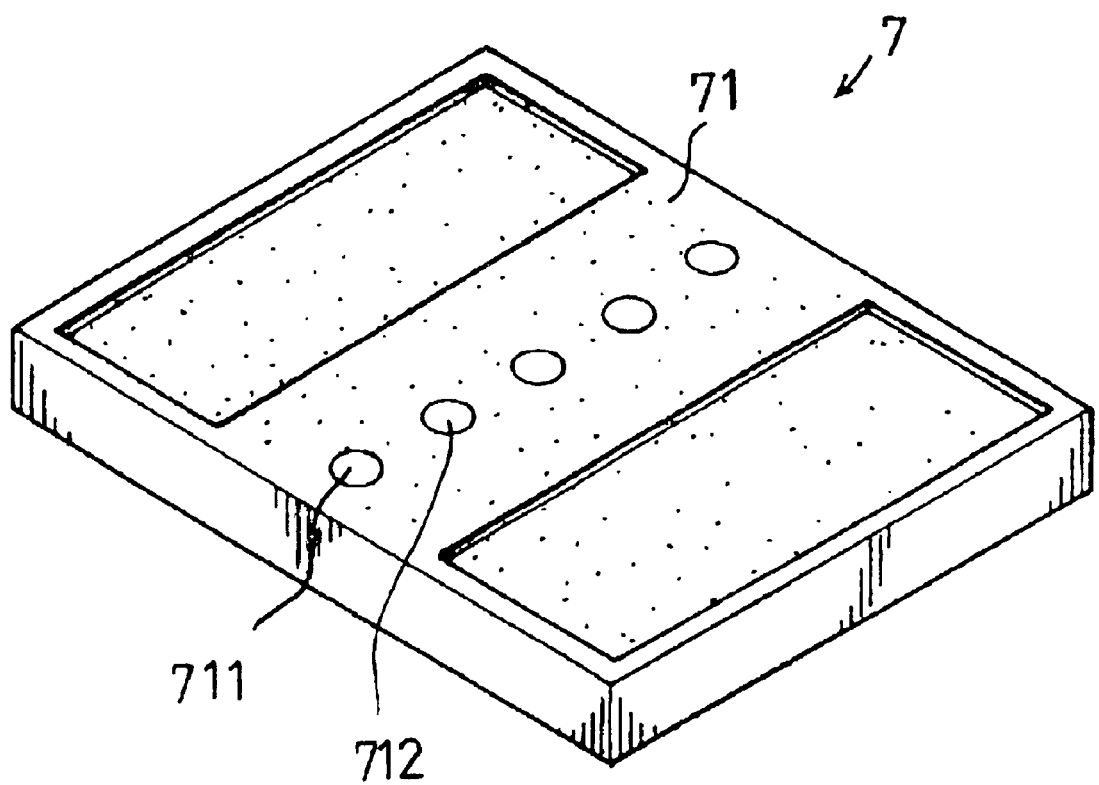
FIG. 7 shows the packaging mold according to the second embodiment of the invention.

Referring to FIG. 7, expecting pots 711, 712, every part of the pot block 71 in a packaging mold 7 with electrostatic discharge protection according to the second embodiment of the invention is roughened. That is, the packaging mold 7 according to the second embodiment of the invention is suitable for all runners with different shapes to reduce static electric charges, because the shape of runner is determined by an upper mold.

While an embodiment of the present invention has been illustrated and described, various modifications and improvements can be made by those skilled in the art. The embodiment of the present invention is therefore described in an illustrative but not restrictive sense. It is intended that the present invention may not be limited to the particular forms as illustrated, and that all modifications which maintain the spirit and scope of the present invention are within the scope as defined in the appended claims.

What is claimed is:

1. A packaging mold with electrostatic discharge protection comprising:

a pot block comprising a plurality of pots and runner, the pot branching and connecting the runners for injecting molding compound into the runners though the pots; and at least one receiver for, supporting a plurality of substrate plates having dice, and receiver connecting the runners and receiving the molding compound from the runners to package the dive on the substrate plates, each receiver comprising a receiving surface contacting the substrate plate, wherein the receiving surface is roughened to reduce static electric charges generated when separating the substrate plates and the packaging mold, and the average roughness of centerline of the roughened receiving surfaces is between 0.25 μm and 1.6 μm.

2. The packaging mold according to claim 1, wherein a surface of the pot block is roughened to reduce static electric charges generated in the runners when separating the molding compound and the runners.

3. The packaging mold according to claim 1, wherein surfaces of the runners are roughened to reduce static electric charges generate din the runners when separating the molding compound and the runners.

* * * * *